Dec. 11, 1934.  R. F. BROWN  1,983,533
WHEEL MOUNT FOR VEHICLES
Filed Dec. 31, 1931   3 Sheets-Sheet 1
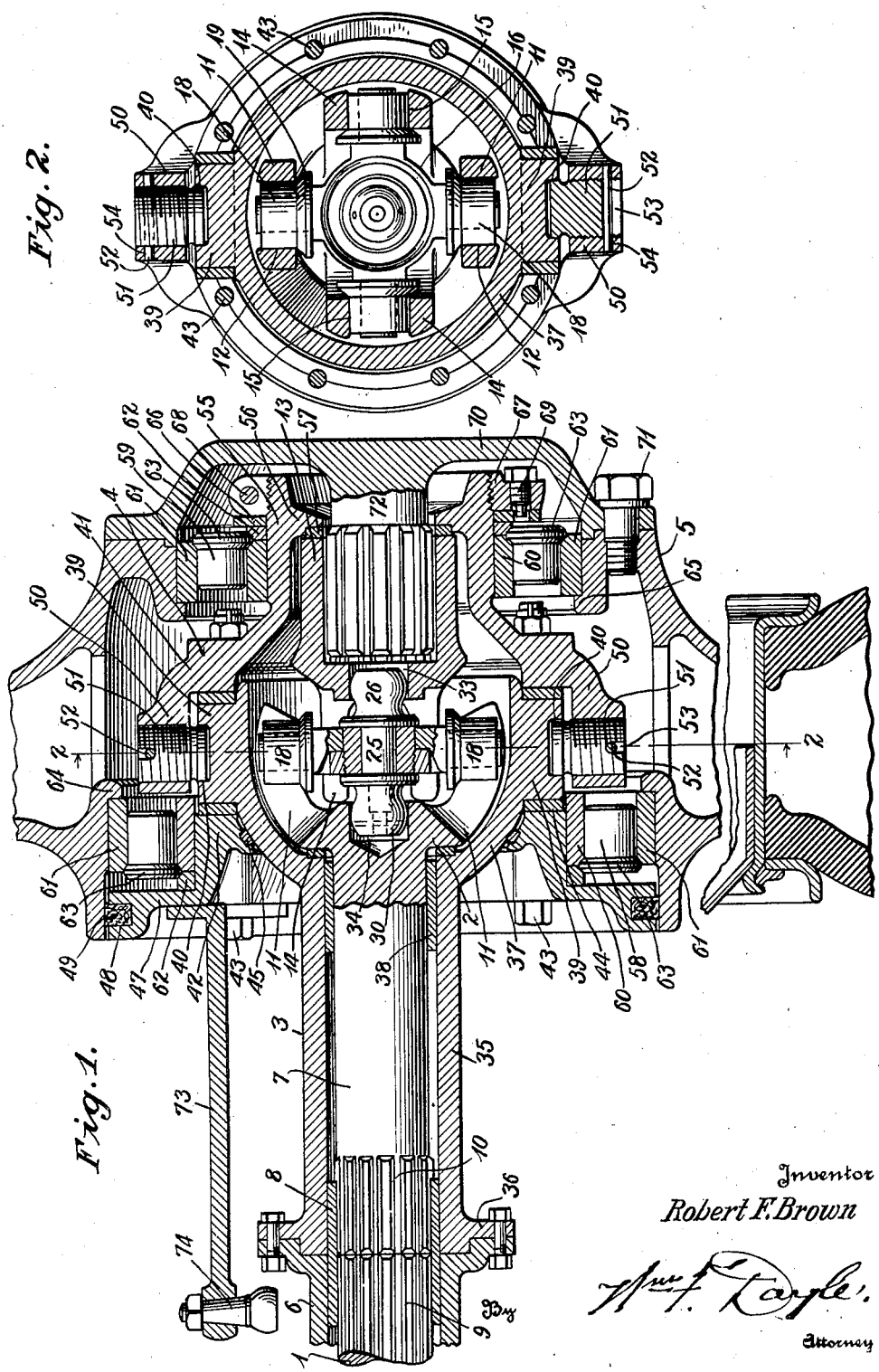
Inventor
Robert F. Brown

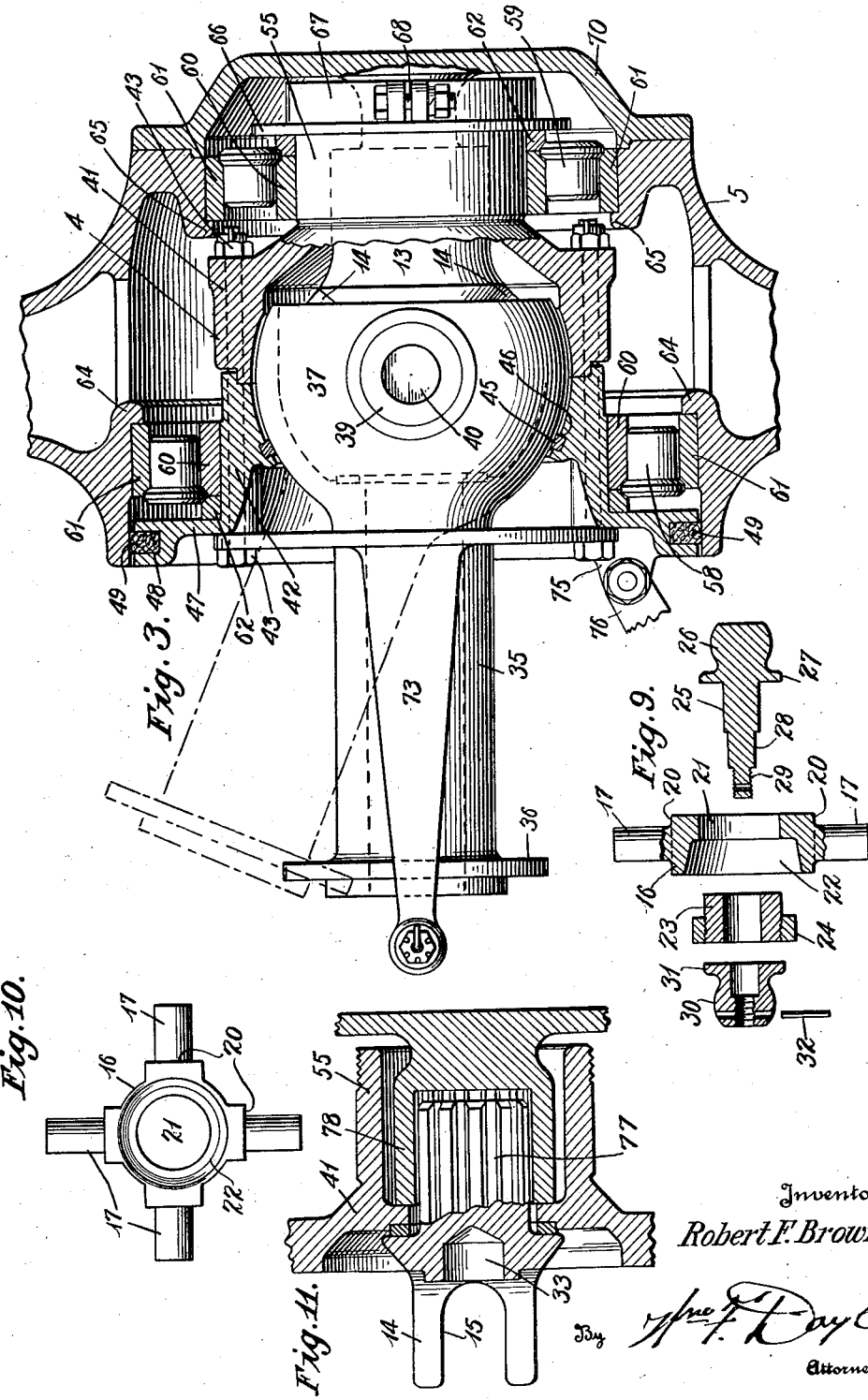

Dec. 11, 1934.  R. F. BROWN  1,983,533
WHEEL MOUNT FOR VEHICLES
Filed Dec. 31, 1931  3 Sheets-Sheet 3
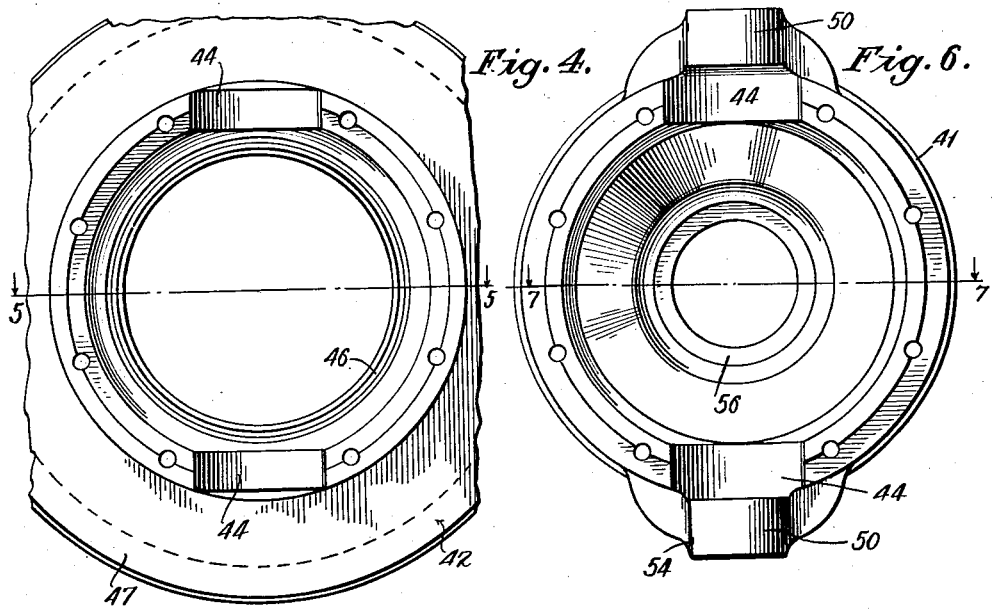
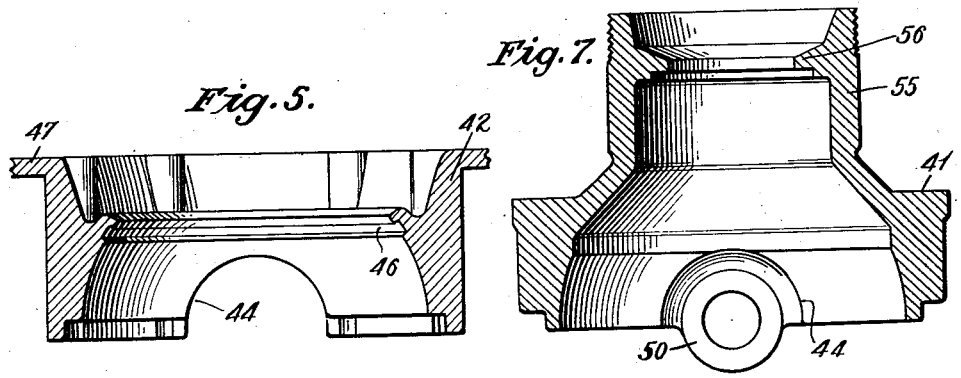
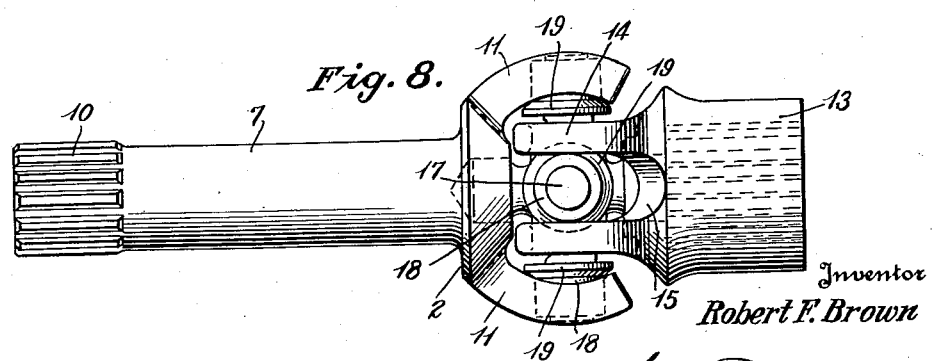
Inventor
Robert F. Brown
By Wm F. Doyle
Attorney Patented Dec. 11, 1934

1,983,533

UNITED STATES PATENT OFFICE 1,983,533

WHEEL MOUNT FOR VEHICLES

Robert F. Brown, Baltimore, Md.

Application December 31, 1931, Serial No. 584,229

21 Claims. (Cl. 180—43)

(Granted under the act of March 3, 1883, as amended April 30, 1928; 370 O. G. 757)

The invention described herein, if patented, may be manufactured and used by or for the Government for governmental purposes without payment of any royalty thereon.

This invention relates to improvements in wheel mounts for vehicles and more particularly to a combined driven steering wheel wherein the wheel is driven at a constant velocity irrespective of the relative angularity of the axes of rotation of the wheel and the drive member.

The objects of this invention are to provide a simple, durable and inexpensive structure wherein the parts are readily accessible for adjustment, repair and replacement.

Another object is to provide means whereby the interior parts are protected from dust, water and other foreign matter and lubrication is provided for by inclosing and sealing the working parts in all positions of the wheel.

Another object is to provide a universal joint whereby the wheel will be driven at a constant velocity regardless of its position in steering.

Another object is to provide a structure wherein the wheel cap may be removed to expose the interior of the hub for the purpose of lubricating or if necessary, the entire hub may be removed from the oscillating or spindle member, for adjustment purposes, without disturbing the remaining parts.

Another objects is to provide a convenient means for the adjustment or replacement of parts at points of greatest wear.

A further object being to provide a structure wherein the minimum of force will be required to oscillate the wheel in steering by arranging the center of oscillation approximately directly above the tread of the wheel, thus preloading the steering linkage, distributing the weight supporting strains, diminishing the steering strains, and permitting an easy movement of the wheel.

These and other objects will appear in the following description and be finally pointed out in the claims.

Similar numerals indicate corresponding parts in all the figures of the drawings forming a part of this application, wherein a preferred form is shown, it being understod that slight changes in form and minor details of construction may be resorted to without departing from the spirit of this invention or fall beyond the scope of the claims.

Fig. 1 is a vertical section of the improved driven steering wheel.

Fig. 2 is a detail vertical section taken on line 2—2 of Fig. 1, looking in the direction of the arrows.

Fig. 3 is a horizontal section of the improved structure, parts being shown in elevation.

Fig. 4 is a detail inner face view of the inner portion of the oscillating or spindle member.

Fig. 5 is a horizontal section of Fig. 4 taken on line 5—5.

Fig. 6 is a view similar to Fig. 4 of the outer portion of the oscillating or spindle member.

Fig. 7 is a horizontal section of Fig. 6 taken on line 7—7.

Fig. 8 shows separated detail elevations of the parts of a universal joint, of the constant velocity type.

Fig. 9 shows separated sections of the universal joint members, through which constant velocity drive is transmitted from the driving, to the driven member.

Fig. 10 is a detail elevation of the anti-friction bearing supporting member of the universal joint.

Fig. 11 is a detail sectional view of a slightly modified form of connection between the universal joint and the hub cap.

By reference to the drawings it will be seen that this invention includes, the power shaft 1, universal joint 2, stationary or dead axle 3, oscillating or wheel spindle 4, and the rotary wheel hub 5.

The power shaft 1, driven in any preferred manner, is inclosed within the axle housing 6, said shaft 1 being separately coupled to the stub drive shaft 7, of the universal joint by splined bearing sleeve 8, in which adjacent splined ends 9 and 10 of shafts 1 and 7 respectively, are seated.

The universal joint is a constant velocity drive, wherein drive and driven members are connected by adjustable means controlled by the relative angularity of axes of rotation of said members.

The drive member of the universal joint consists of the stub shaft 7 connected at one end with the power shaft, and is provided at its other end with oppositely arranged curved arms 11 provided with slots 12 adapted to receive and form raceways for oppositely arranged anti-friction bearings, carried by the connecting member.

The driven member of the universal joint consists of a splined sleeve 13 and oppositely arranged curved arms 14, similar to arms 11, slotted at 15 and adapted to receive and form race ways for oppositely arranged anti-friction bearings of said connecting member.

To provide a compact and economically manufactured connecting member for the transfer of power from the drive to the driven member of the universal joint, with means for supporting and controlling the position of same with relation to the relative angle of rotation of the axes of said members and thus provide a drive of constant or uniform velocity throughout the entire cycle of rotation of the parts, the connecting member of the universal joint, consists of a spider or cross-shaped member having a body portion 16, from which four bearing arms project at 90 degree angles, said arms being provided with bearings 17 on which anti-friction rollers 18 having flanges 19, are mounted.

Shoulders 20 of said arms prevent inward displacement, and flanges 19 being of greater diameter than slots 12 and 15 of arms 11 and 14, prevent outward displacement of the rollers 18. The body portion 16 has a central opening 21 and a cut-away portion 22 adapted to receive a bushing 23 and collar 24, said bushing having a central bore.

An assembly and supporting bolt 25 having a spherical head 26 and a flange 27 slightly greater in diameter than opening 21 in the body portion 16, is adapted to snugly fit the bore of the bushing 23. The bolt is reduced in diameter as seen at 28 beyond the bushing and near its extreme end is further reduced and threaded as at 29.

A nut having a spherical head 30 and flange 31 similar to the head and flange 26 and 27 of the bolt, is bored, threaded and mounted on the reduced and threaded portions of the bolt, and a cotter pin 32 is passed through the nut and end of bolt to lock the parts against accidental separation.

The spherical heads 26 and 30 of the assembly bolt and nut, are mounted in cylindrical bearing openings 33 and 34 in adjacent ends of the driven and drive members of the universal joint respectively, thus adjustably supporting the connecting member in place.

When the parts of the universal joint are assembled it will be seen that arms 11 and 14 and their slots 12 and 15 are on an arc, the center of which is the center of the connecting member, which permits the rocking of the connecting member regardless of the rotary position of the drive and driven members, thus providing what may be termed slipping or adjustable connections between the arms of the drive and driven members, the positions of which are controlled in the manner and for the purpose described.

The torque of the drive member is transferred to the driven member of the joint, through adjustable bearing rollers of the connecting member, said adjustment being determined by the relative angle of the axes of the drive and driven members. The rotary axes of the steering wheel remains co-incident with the rotary axis of the driven member in all its positions. The axis of movement of the oscillating member 4, passes vertically through center of universal joint and is directly over tread of wheel.

A specific manner of transferring power from the drive to the driven member of the universal joint through adjustable means, is shown, but various modifications may be found expedient, it being necessary only to provide means for the transfer of torque through adjustable connections controlled by the relative angle of rotary axes of the drive and driven members.

The stationary or dead axle is that portion on which parts pivot or oscillate in the steering movement of the wheel, and consists of housing 35 provided at one end with flange 36 removably connected by bolts to a corresponding flange on axle housing 6, to form a continuation of same, said connection being in line with the division between the power shaft 1 and drive shaft 7 of the universal joint, and is thus arranged for purposes of economy of manufacture, repair and replacement of parts.

The opposite or outer end of housing 35, is provided with a hollow parti-spherical shaped portion 37, within which the universal joint operates, shaft 7 of said joint is mounted in bearing 38 in housing 35.

The spherical portion 37 is provided with upper and lower trunnions 39, in vertical co-axial alignment with the center of oscillation of the universal joint. The axial king pin sockets 40 are arranged in the outer faces of trunnions 39.

The oscillating wheel spindle 4 is a hollow casing consisting of complementary parts 41 and 42 divided on a vertical plane passing centrally through trunnions 39 and center of oscillation of the universal joint. The meeting faces of parts 41 and 42 are notched and firmly secured together by bolts 43.

Part 41 of the oscillating member covers the outer open portion of the spherical end of the stationary or dead axle, and, when assembled with part 42 of the oscillating member, upper and lower bearing openings 44 are provided for the reception of the trunnions 39 of the stationary member.

The inner portion or part 42 of the oscillating member partly encircles the spherical portion 37 terminating in a vertical plane and is provided with a lubricant retaining and foreign matter excluding seal 45 of felt or the like mounted in annular groove 46, said seal bearing snugly against the spherical portion of the stationary member in all positions of the oscillating member. Part 42 is further provided with an inner annular flange 47, in the outer edge of which is mounted in groove 48, a felt seal 49 in contact with an inner flange of the wheel hub.

Adjustably mounted in upper and lower lugs 50 extending from part 41 of the oscillating member are thrust or king pins 51 entering sockets 40 in the ends of the trunnions, said pins being secured in position by lock pins 52 passing through slots 53 in the outer ends of pins 51, and openings 54 in lugs 50. Oscillating member 40 is further provided with a cylindrical portion 55 which surrounds and extends beyond the end of splined sleeve 13 of the universal joint, said portion 55 having an inner annular flange 56 provided with an annular seal 57 resting against the outer end of the splined sleeve 13, thus serving to retain lubricant and exclude foreign matter from the cavity occupied by the universal joint.

The oscillating member 40 is further provided with annular surfaces on which the inner roller race members of inner and outer roller bearings 58 and 59 are mounted.

Bearings 58 and 59 may be of any preferred construction. The form shown having inner and outer roller races 60 and 61, between which the rollers operate, the inner races being grooved, or beveled at their edges, and with correspondingly beveled rings 62, grooves between said parts are provided for the reception of flanges 63 on the rollers, said structure being adapted to take up any lateral thrust placed upon the parts. The bearings may be of any detail construction preferably of a unitary type wherein all wearing parts may be conveniently removed when desired.

The wheel hub 5, comprises a shell having annular surfaces adapted to receive the outer roller races 61 of the roller bearings 58 and 59. Inner roller bearing 58 is seated in the hub shell with its outer race 61 resting against annular flange 64. Outer roller bearing 59 is seated in the hub shell with its outer race 61 resting against annular flange 65. The outer roller bearing is retained in place by washer 66 and split ring 67, the latter threaded on the outer end of cylindrical portion 55 of the oscillating spindle, and clamped in place by bolt 68, said washer 66 and ring 67 being locked to prevent accidental rotary movement by bolt 69 threaded through ring 67 and entering an opening in washer 66.

The outer end of the hub shell is closed by hub cap 70 securely clamped in place by bolts 71. Extending inwardly from the center of hub cap 70 is splined stub shaft 72 engaging the splined sleeve 13 of the driven member of the universal joint, from which rotary movement is transferred to the wheel. Hub cap 70 is tightly clamped in place and with seal 45 serves to retain lubricant and exclude foreign matter from the roller bearings and other parts outside of the oscillating member.

Any or all of the plain bearings shown, may be replaced by adjustable roller, ball or any other improved bearings if though expedient.

The usual arm 73 for oscillating the wheel in steering is provided having a curved base at one end clamped to the oscillating member 4, beneath bolts 43, the other end being provided with bolt 74 for connection with steering rod not shown.

The oscillating spindle 4 at its inner portion is adapted to contact with housing 35 and limit the swing of the spindle to within the capacity of the universal joint. Said spindle is also provided with a lug 75 to which one end of a tie rod 76 is connected to cause simultaneous oscillation of the wheels in steering.

A slight modification of the connection between the driven member of the universal joint and the hub cap, is shown in Fig. 11 wherein said member is provided with a splined stub shaft 77 and the splined sleeve 78 is made a part of the hub cap 70.

Reference is made to the easy, accessibility of the parts whereby should serious damage be sustained by the wheel and knuckle, the entire assembly may be removed at the splice of the axle housing and division between the power and drive shafts 1 and 7. Should lubrication or repair of the outer portions of the structure be necessary, the removal of the hub cap is all that is necessary. Should the main or wheel bearings, or the trunnions of the oscillating member need attention, the wheel hub may be removed to expose same without disturbing the parts that remain.

It is further noted that not only are those parts that receive the greatest wear, quickly and economically adjusted, repaired or replaced, but in some instances they may be reversed, thus lengthening the useful life of same, said reversible parts include the stationary or dead axle member 3 and the oscillating wheel spindle 4. The lower bearings of said parts carry the entire weight supported by the wheel and the reversal of either or both, will increase the life and satisfactory operation of same.

Trunnions 39 are mounted in upper and lower bearing openings in the oscillating member 4. Interposed between the trunnions 39 and said bearing openings 44, in seats arranged parallel with the axes of the trunnions, are bearing collars adapted to reduce friction between said parts, said collar may be of any well known anti-friction metal such as graphite-bearing steel or the like and may be readily replaced when worn.

Thrust or king pins 51 may be adjusted to correctly position the oscillating member with relation to the spherical portion of the dead axle to provide the necessary clearance between the parts. Said pins are readily adjustable after periods of use to take up wear of the parts. Preferably the inner unthreaded ends of pins 51, which engage in sockets 40 in the ends of the trunnions 39, are made of anti-friction metal such as graphite-steel or the like to reduce friction. Pins 50 may be readily replaced if worn and are secured in adjusted positions by lock pins 52 engaging slots 53 in the ends of the pins and openings 54 of lugs 50.

A simple form of adjustable anti-friction bearing connection between the dead axle head and the oscillating member is shown, it being obvious however that any one of a variety of specific means may be found expedient such as removable instead of integral trunnions projecting from the dead axle member and any standard form of anti-friction ball or roller bearing provided with adjustable means to take up wear.

Having thus described my invention, what I claim as new and desire to secure by Letters Patent is:

1. In a mechanism of the class described, a stationary axle housing having a parti-spherical outer surface from which project external diametrically opposite upwardly and downwardly extending co-axial trunnions, an oscillating spindle member swiveled on said trunnions and having an inward extension encircling said surface and terminating in a vertical plane, a grease seal ring carried by said extension and engaging said surface, a wheel rotatably mounted on the oscillating spindle having its tread in vertical alignment with said trunnions, a drive shaft, and means for driving the wheel from said shaft, including a universal joint of a constant velocity type arranged substantially within the stationary housing, said universal joint being balanced upon the trunnion axis so as to be uniformly effective throughout the range of swing of the movable spindle.

2. In a mechanism of the class described, a stationary axle housing having a hollow ball-shaped portion provided with diametrically opposite upwardly and downwardly projecting trunnions, an oscillating spindle member having upper and lower sockets into which said trunnions extend, said sockets having seats arranged parallel to the axes of the trunnions, anti-friction bearings resting in said seats and interposed between said sockets and trunnions, a wheel mounted on said spindle member on bearings arranged on opposite sides of the axes of said trunnions with its tread in line with said axes and means for adjusting the trunnions in said bearings.

3. In a mechanism of the class described, a hollow ball housing provided with diametrically opposite upwardly and downwardly extending external co-axial trunnions, an oscillating spindle swiveled on said trunnions and having a projecting sleeve, a constant velocity universal joint arranged substantially within the ball housing and having an outward extension driven by said joint, a cap having an inward extension connected to said outward extension of said joint throughout its length to support same and a steering wheel rotatably mounted on the oscillating spindle and driven by said cap, said universal joint being balanced relatively to the axis of said trunnions.

4. A front wheel drive for motor vehicles, comprising a stationary ball housing having parti-spherical inner and outer surfaces, diametrically opposite external co-axial trunnions projecting upwardly and downwardly from the outer surface of the housing, an oscillating spindle swiveled on said trunnions and having a projecting sleeve, a steering wheel surrounding the oscillating spindle, provided with a hub surrounding said spindle, anti-friction thrust bearings interposed between the hub and spindle, functioning to retain the hub on said spindle, means for detachably securing one of said bearings on the sleeve, a cap detachably connected to the hub having a splined projection extending inwardly through said sleeve, a stub extension splined to said projection from the cap throughout its length, and means for driving said splined members including a constant velocity universal joint arranged within said housing and oscillating spindle, said universal joint being balanced relatively to the axis of said trunnions.

5. Front wheel drive mechanism for motor vehicles, comprising an axle housing, a male ball housing rigidly united with the axle housing and having upwardly and downwardly extending external co-axial trunnions, a movable female spindle member swiveled on said trunnions and comprising inner and outer sections detachably connected together, a grease seal carried by the movable spindle and normally bearing upon the outer surface of the male housing along a plane perpendicular to the axis of the axle housing, an outwardly extending sleeve projecting from the movable member, a drive shaft in the axle housing, a constant velocity universal joint assembly so arranged within said housing and spindle relative to the trunnion axis as to be uniformly effective through the range of swing of the movable spindle, said assembly being driven by said shaft, a wheel rotatably mounted on said movable spindle having its rim surrounding the portion of the housing and movable spindle along the plane of the axis of the trunnions, and means for driving the wheel from said universal joint assembly.

6. Front wheel drive mechanism for motor vehicles, comprising an axle housing, a male ball housing rigidly united with the axle housing and having upwardly and downwardly extending external co-axial trunnions, a movable female hollow spindle swiveled on said trunnions and comprising inner and outer sections detachably connected together, a grease seal carried by the movable spindle and normally bearing upon the outer surface of the male housing along a plane perpendicular to the axis of the axle housing, an outwardly extending sleeve projecting from the movable spindle, a driving shaft in the axle housing, a constant velocity universal joint assembly arranged within said housing and driven by said shaft, a wheel rotatably mounted on said movable female hollow spindle and having its rim surrounding the portion of the housing and movable spindle along the plane of the axis of the trunnions, means for driving the wheel from said universal joint assembly, and a steering arm projecting inwardly from the movable spindle.

7. A device of the class described, comprising a hollow axle housing, and a power shaft operating therein, an extension detachably connected to said housing and terminating in a hollow parti-spherical portion having diametrically opposite external upwardly and downwardly extending trunnions, an oscillating spindle pivotally mounted on said trunnions and partly surrounding said spherical portion and provided with a seal between said parti-spherical portion and oscillating spindles, an inwardly extending hub bearing flange on said oscillating member and an outwardly extending cylindrical portion, a wheel hub rotatably mounted on said oscillating member, a constant velocity universal joint operating within said spherical portion having an inwardly extending member connected with the drive shaft and an outward splined extension within said cylindrical extension of the oscillating member, a cap detachably mounted on said hub having an inwardly extending projection slidably mounted on said universal joint member for driving the wheel.

8. A device of the class described, comprising a hollow axle housing and a power shaft operating therein, an axle housing extension detachably connected to said housing, terminating in a hollow parti-spherical portion having oppositely arranged external upwardly and downwardly extending trunnions, an oscillating spindle formed of detachably connected sections pivotally mounted on said trunnions, means for adjusting the oscillating member on said trunnions, a wheel hub mounted on the oscillating spindle, seals mounted in said oscillating spindle in contact with the spherical portion and said wheel hub, a cap detachably mounted on the hub, having an inward extension, a constant velocity universal joint operating within said parti-spherical portion detachably connected to said power shaft on a plane in line with the division between said hollow axle and its extension and at its outer end with said cap extension.

9. A device of the class described, comprising an anxle housing and a power shaft, an extension detachably connected to said housing and terminating in a parti-spherical portion, having oppositely arranged upwardly and downwardly extending trunnions, an oscillating spindle having inner and outer hub bearing surfaces, pivotally mounted on said trunnions between said bearing surfaces, a wheel hub mounted on said oscillating spindle, a cap detachably mounted on the hub, a constant velocity universal joint operating within said parti-spherical portion and connected with said power shaft and said cap.

10. A device of the class described, comprising a hollow axle housing and a power shaft operating therein, an invertible extension detachably connected to said housing, terminating in a parti-spherical portion, oppositely arranged vertical trunnions extending from said portion, an invertible oscillating member formed of a plurality of sections connected on a plane of the axis of said trunnions and having an extension partly surrounding said spherical portion, an inner hub bearing flange and an outwardly extending cylindrical hub bearing portion, a wheel hub rotatably mounted on said oscillating spindle, a cap detachably mounted on said hub and a constant velocity universal joint operating within said parti-spherical portion balanced on the axis of said trunnions and connected with said power shaft at the point of division between said axle housing and its extension, and with said cap for driving the wheel at constant velocity at all angles of its axis.

11. In a mechanism of the class described, a stationary housing having a parti-spherical outer surface from which projects external diametrically opposite upwardly and downwardly extending co-axial trunnions, a movable member swiveled on said trunnions and having an annular opening encircling said surface and arranged in a vertical plane, a grease seal ring arranged in said annular opening and engaging said surface, a wheel rotatably mounted on the movable housing, a drive shaft, and means for driving the wheel from said shaft, including a universal joint device of constant velocity type arranged substantially within the stationary housing, said universal joint device being balanced upon the trunnion axis so as to be uniformly effective throughout the range of swing of the movable housing.

12. A mechanism of the class described, comprising a one-piece stationary ball housing having diametrically opposite external upwardly and downwardly extending trunnions, a movable member swiveled on said trunnions and formed of detachably connected sections joined along the plane of the axes of said trunnions, one of said sections projecting outwardly from the trunnions and the other section projecting inwardly from the trunnions, a wheel rotatably mounted on the movable member, and means including a constant velocity universal joint assembly so arranged within said housing and movable member relatively to the trunnion axis as to be uniformly effective throughout the range of swing of the movable housings.

13. Front wheel drive mechanism for vehicles, comprising an axle housing, a male ball housing rigidly united with the axle housing and having upwardly and downwardly extending external co-axial trunnions, a movable female member swiveled on said trunnions and comprising inner and outer sections detachably connected together, a grease seal carried by the movable member and normally bearing upon the outer surface of the male housing along a plane perpendicular to the axis of the axle housing, an outwardly extending sleeve projecting from the movable member, a driving shaft in the axle housing, a constant velocity universal joint assembly so arranged within said housing and movable member relative to the trunnion axis, as to be uniformly effective through the range of swing of the movable member, said assembly being driven by said shaft, a wheel rotatably mounted on the sleeve and having its rim surrounding the portion of the housing along the plane of the axes of the trunnions, and means for driving the wheel from the universal joint assembly.

14. Front wheel drive mechanism for motor vehicles, comprising an axle housing, a male ball housing rigidly united with the axle housing and having upwardly and downwardly extending external co-axial trunnions, a movable female member swiveled on said trunnions and comprising inner and outer sections detachably connected together, a grease seal carried by the movable member and normally bearing upon the outer surface of the male housing along a plane perpendicular to the axis of the axle housing, an outwardly extending sleeve projecting from the movable member, a driving shaft in the axle housing, a constant velocity universal joint assembly arranged within said housing and movable member and driven by said shaft, a wheel rotatably mounted on the movable member and having its rim surrounding the portion of the housing along the plane of the axes of the trunnions, means for driving the wheel from said universal joint assembly, and a steering arm projecting inwardly from the movable housing.

15. In a mechanism of the class described, a stationary housing having a parti-spherical outer surface from which projects external diametrically opposite upwardly and downwardly extending co-axial trunnions, a movable housing swiveled on said trunnions and having an annular mouth encircling said surface and arranged in a vertical plane, a grease seal ring arranged in a vertical plane and carried by the mouth and engaging said surface, a wheel rotatably mounted on the movable housing, a drive shaft, and means for driving the wheel from said shaft, including a universal joint device of constant velocity type arranged substantially within the stationary housing, said universal joint device being balanced upon the trunnion axis so as to be uniformly effective throughout the range of swing of the movable housing.

16. In mechanism of the character described, a hollow ball housing provided with diametrically opposite upwardly and downwardly extending external coaxial trunnions, a movable housing swiveled on said trunnions and having a projecting sleeve, a constant velocity universal joint device arranged substantially within the ball housing, a stub shaft driven by said joint, a cap having an inwardly extending sleeve surrounding said shaft and projecting inwardly to a point in close proximity to the universal joint device to furnish utmost support for the shaft, the last mentioned sleeve being splined to the shaft, and a steering wheel rotatably mounted on the first mentioned sleeve and driven by said cap, said axle joint device being balanced relatively to the axis of said trunnions.

17. In mechanism of the character described, a stationary ball housing having diametrically opposite upwardly and downwardly extending external coaxial trunnions, a movable housing swiveled on said trunnions, and having an outwardly projecting sleeve, a wheel surrounding the portion of the movable housing which is swiveled to the trunnions, and having a projecting hub rotatably mounted on said sleeve, a cap rigidly connected to said hub and provided with an elongated second sleeve which projects through the first mentioned sleeve, a stub shaft extending along and splined to the second sleeve, and a universal joint arranged substantially within the ball housing for driving the stub shaft, said universal joint device being balanced relatively to the axis of said trunnions.

18. A front wheel drive for motor vehicles, comprising a stationary ball housing having parti-spherical inner and outer surfaces, diametrically opposite external coaxial trunnions projecting upwardly and downwardly from the outer surface of the housing and having their axes coaxially arranged, a movable housing swiveled on said trunnions and having a projecting sleeve, a steering wheel surrounding the portion of the movable housing which is swiveled to the trunnions, and provided with a projecting hub surrounding said sleeve, anti-friction thrust bearings interposed between the hub and sleeve, functioning to retain the hub on said sleeve, means for detachably securing one of said bearings to the sleeve, a cap detachably connected to the hub and having a second sleeve projecting inwardly through the first sleeve, a stub shaft splined to the second sleeve throughout more than half the length of the latter, and means for driving said stub shaft including a constant velocity universal joint device arranged within said housings, said universal joint device being balanced relatively to the axis of said trunnions.

19. A mechanism of the class described, comprising a one-piece stationary ball housing having diametrically opposite external upwardly and downwardly extending trunnions a movable housing swiveled on said trunnions and formed of detachably connected sections joined along the plane of the axes of said trunnions, one of said sections projecting outwardly from the trunnions and the other section projecting inwardly from the trunnions, a wheel rotatably mounted on the movable housing, and means including a constant velocity universal joint assembly so arranged within said housings relatively to the trunnion axis as to be uniformly effective through the range of swing of the movable housing.

20. Front wheel drive mechanism for motor vehicles, comprising an axle housing, a male ball housing rigidly united with the axle housing and having upwardly and downwardly extending external coaxial trunnions, a movable female ball housing swiveled on said trunnions and comprising inner and outer sections detachably connected together, a grease seal carried by the movable housing and normally bearing upon the outer surface of the male housing along a plane perpendicular to the axis of the axle housing, an outwardly extending sleeve projecting from the movable housing, a driving shaft in the axle housing, a constant velocity universal joint assembly so arranged within said housings relative to the trunnion axis as to be uniformly effective through the range of swing of the movable housing, said assembly being driven by said shaft, a wheel rotatably mounted on the sleeve and having its rim surrounding the portion of the housings along the plane of the axes of the trunnions, and means for driving the wheel from said universal joint assembly.

21. Front wheel drive mechanism for motor vehicles, comprising an axle housing, a male ball housing rigidly united with the axle housing and having upwardly and downwardly extending external coaxial trunnions, a movable female ball housing swiveled on said trunnions and comprising inner and outer sections detachably connected together, a grease seal carried by the movable housing and normally bearing upon the outer surface of the male housing along a plane perpendicular to the axis of the axle housing, an outwardly extending sleeve projecting from the movable housing, a driving shaft in the axle housing, a constant velocity universal joint assembly arranged within said housings and driven by said shaft, a wheel rotatably mounted on the sleeve and having its rim surrounding the portion of the housings along the plane of the axes of the trunnions, means for driving the wheel from said universal joint assembly, and steering arms projecting inwardly from the movable housing.

ROBERT F. BROWN.